United States Patent
Yamashita

(10) Patent No.: US 11,009,170 B2
(45) Date of Patent: May 18, 2021

(54) THERMALLY CONDUCTIVE COVER FOR PIPING SYSTEM, HEATING DEVICE FOR PIPING SYSTEM, MANUFACTURING METHOD AND ATTACHMENT METHOD FOR THERMALLY CONDUCTIVE COVER, AND MANUFACTURING METHOD AND ATTACHMENT METHOD FOR HEATING DEVICE

(71) Applicant: NICHIAS CORPORATION, Tokyo (JP)

(72) Inventor: Kaori Yamashita, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 16/483,348

(22) PCT Filed: Feb. 16, 2017

(86) PCT No.: PCT/JP2017/005723
§ 371 (c)(1),
(2) Date: Aug. 2, 2019

(87) PCT Pub. No.: WO2018/150518
PCT Pub. Date: Aug. 23, 2018

(65) Prior Publication Data
US 2019/0376633 A1    Dec. 12, 2019

(51) Int. Cl.
*H05B 3/58*    (2006.01)
*F16L 53/38*   (2018.01)
(Continued)

(52) U.S. Cl.
CPC .............. *F16L 53/38* (2018.01); *F16B 19/00* (2013.01); *F16L 58/00* (2013.01); *F16L 59/00* (2013.01)

(58) Field of Classification Search
CPC . F16B 19/00; F16L 53/00; F16L 53/30; F16L 53/38; F16L 58/00; F16L 58/02;
(Continued)

(56) References Cited

U.S. PATENT DOCUMENTS 4,329,569 A * 5/1982 Hjortsberg ............... H05B 3/16
138/33
4,474,493 A   10/1984 Welch
(Continued)

FOREIGN PATENT DOCUMENTS

CN    103542231 A    1/2014
CN    204372431 U    6/2015
(Continued)

OTHER PUBLICATIONS

Apr. 4, 2017 Search Report issued in International Patent Application No. PCT/JP2017/005723.
(Continued)

*Primary Examiner* — Sang Y Paik
(74) *Attorney, Agent, or Firm* — Oliff PLC

(57) ABSTRACT

A thermally conductive cover improves workability of attachment and detachment. The thermally conductive cover includes a first thermal conductor on which a coupling hole is formed and a second thermal conductor on which a coupling hole is formed. The thermally conductive cover further includes a coupling member having a first inserted part to be inserted into the coupling hole and a second inserted part to be inserted into the coupling hole. At least one of the inserted parts is elastically deformable in a direction perpendicular to an inserting direction of the coupling member.

20 Claims, 8 Drawing Sheets

(51) Int. Cl.
*F16B 19/00* (2006.01)
*F16L 59/00* (2006.01)
*F16L 58/00* (2006.01)

(58) Field of Classification Search
CPC . F16L 58/04; F16L 58/08; F16L 59/00; F16L 59/02; F16L 59/021; F16L 59/022; F16L 59/024; F16L 59/025
USPC .................................. 219/531–535, 546–548
See application file for complete search history.

(56) References Cited

U.S. PATENT DOCUMENTS

| | | | |
|---|---|---|---|
| 4,553,023 A * | 11/1985 | Jameson | ................ F16L 53/38 |
| | | | 392/472 |
| 4,944,987 A * | 7/1990 | Cordia | .............. B29C 66/91411 |
| | | | 428/192 |
| 5,362,185 A | 11/1994 | Haack | |
| 2005/0067038 A1 | 3/2005 | Kobayashi et al. | |
| 2006/0153640 A1 | 7/2006 | Hofmann | |
| 2006/0289471 A1 | 12/2006 | Sasaki et al. | |
| 2011/0052897 A1 | 3/2011 | Goto et al. | |
| 2012/0061388 A1 * | 3/2012 | Jacques | ................ F16L 59/024 |
| | | | 220/4.21 |

| | | |
|---|---|---|
| 2016/0003397 A1 | 1/2016 | Miyazaki et al. |

FOREIGN PATENT DOCUMENTS

| | | |
|---|---|---|
| CN | 205745834 U | 11/2016 |
| EP | 1 529 966 A1 | 5/2005 |
| GB | 2 180 611 A | 4/1987 |
| JP | S59-131011 A | 7/1984 |
| JP | H05-507545 A | 10/1993 |
| JP | H10-204943 A | 8/1998 |
| JP | 2003-185086 A | 7/2003 |
| JP | 2007-002986 A | 1/2007 |
| JP | 2010-071314 A | 4/2010 |
| TW | 200525107 A | 8/2005 |
| TW | 200716900 A | 5/2007 |
| TW | 201109169 A1 | 3/2011 |
| TW | 201500193 A | 1/2015 |

OTHER PUBLICATIONS

Jan. 22, 2020 Office Action issued in Chinese Patent Application No. 201780086693.2. (with partial translation).
Aug. 21, 2020 Office Action issued in Chinese Patent Application No. 201780086693.2.

* cited by examiner

THERMALLY CONDUCTIVE COVER FOR PIPING SYSTEM, HEATING DEVICE FOR PIPING SYSTEM, MANUFACTURING METHOD AND ATTACHMENT METHOD FOR THERMALLY CONDUCTIVE COVER, AND MANUFACTURING METHOD AND ATTACHMENT METHOD FOR HEATING DEVICE

TECHNICAL FIELD

The present invention relates to a thermally conductive cover for covering a piping system including pipes and valves coupled to the pipes, and a heating device for heating the piping system.

BACKGROUND ART

Devices including a pipe where fluid, such as gas and liquid flows (e.g., devices for manufacturing semiconductor), may have a heater outside the pipe so as to keep the fluid at a high temperature. When a small diameter pipe is used, apart of the pipe may have a low temperature because the heater is not in closely contact with the outside of the pipe, and thus the temperature may not be uniform throughout the pipe. To prevent this from occurring, a block formed of a high thermal conductivity material, such as aluminum, has been used to cover the outside of the pipe, and a heater has been used to cover the outside of the block (e.g., see Patent Literature 1). Here, such a block is referred to as "covering block". The covering block has a cylindrical shape, and includes a pipe on its inside. Such a structure allows the covering block to be in closely contact with the heater in a relatively easy way, and thus the temperature can be readily made uniform throughout the pipe.

CITATION LIST

Patent Literature

Patent Literature 1: JP2007-2986A

SUMMARY OF INVENTION

Technical Problem

The covering block is formed of two parts each having a half-cylindrical shape (here, such a part is referred to as "block half"). These two block halves are joined together to form a cylindrical covering block. To join the two block halves together, fixtures surrounding the outside of the covering block, such as rings and screws, are used. However, the covering blocks are not easily attached or detached in the structure using such fixtures.

One of objects of the present invention is to provide a thermally conductive cover and a heating device capable of improving workability of attachment and detachment, a manufacturing method and an attachment method of the thermally conductive cover, and a manufacturing method and an attachment method of the heating device.

Solution to Problem

In order to solve the above described problems, a thermally conductive cover includes a first thermal conductor for covering a piping system, the first thermal conductor being formed of metal and including a first surface on which a first hole is formed, a second thermal conductor for, coupled with the first thermal conductor, covering the piping system, the second thermal conductor being formed of metal, including a second surface on which a second hole is formed, the second surface opposing to the first surface, a coupling member including a first inserted part to be inserted into the first hole and a second inserted part to be inserted into the second hole and coupling the first thermal conductor with the second thermal conductor. At least one of the first inserted part or the second inserted part is elastically deformable in a direction perpendicular to an inserting direction of the coupling member. According to the thermally conductive cover, workability of attachment and detachment of the thermal conductor can be improved.

In order to solve the above described problems, a heating device includes the thermally conductive cover and a heater that covers the thermally conductive cover and heats the piping system through the thermally conductive cover. According to the heating device, workability of attachment and detachment of the thermal conductor can be improved.

In order to solve the above described problems, a manufacturing method and an attachment method for the thermally conductive cover are provided as follows. The thermally conductive cover according to the methods includes a first thermal conductor for covering a piping system, the first thermal conductor being formed of metal and including a first surface on which a first hole is formed, a second thermal conductor for, coupled with the first thermal conductor, covering the piping system, the second thermal conductor being formed of metal, including a second surface on which a second hole is formed, the second surface opposing to the first surface, a coupling member including a first inserted part to be inserted into the first hole and a second inserted part to be inserted into the second hole. The manufacturing method for the thermally conductive cover includes inserting the first inserted part into the first hole and thereby attaching the coupling member to the first thermal conductor such that the second inserted part protrudes from the first surface, the second inserted part being elastically deformable in a direction perpendicular to an inserting direction of the first inserted part. The attachment method for the thermally conductive cover includes, in a state where the first inserted part is inserted into the first hole and the coupling member is attached to the first thermal conductor such that the second inserted part protrudes from the first surface, inserting the second inserted part into the second hole of the second thermal conductor so that the first thermal conductor and the second thermal conductor are joined together to cover the piping system, the second inserted part being elastically deformable in a direction perpendicular to an inserting direction of the first inserted part.

In order to solve the above described problems, a manufacturing method and an attachment method for the heating device are provided as follows. The heating device according to the methods includes a first thermal conductor for covering the piping system, the first thermal conductor being formed of metal and including a first surface on which a first hole is formed, a second thermal conductor for, coupled with the first thermal conductor, covering the piping system, the second thermal conductor being formed of metal, including a second surface on which a second hole is formed, the second surface opposing to the first surface, a coupling member including a first inserted part to be inserted into the first hole and a second inserted part to be inserted into the second hole, and a heater for heating the piping system through the thermal conductors by covering the thermal conductors. The manufacturing method for the heating device includes inserting the first inserted part into the first hole and thereby attaching the coupling member to the first thermal conductor such that the second inserted part protrudes from the first surface, the second inserted part being elastically deformable in a direction perpendicular to an inserting direction of the first inserted part. The attachment method for the heating device includes, in a state where the first inserted part is inserted into the first hole and the coupling member is attached to the first thermal conductor such that the second inserted part protrudes from the first surface, inserting the second inserted part into the second hole of the second thermal conductor so that the first thermal conductor and the second thermal conductor are joined together to cover the piping system, the second inserted part being elastically deformable in a direction perpendicular to an inserting direction of the first inserted part.

BRIEF DESCRIPTION OF THE DRAWINGS

In FIG. 3, the heater covers the outside of the thermally conductive cover;

DESCRIPTION OF EMBODIMENTS

Figure 1:
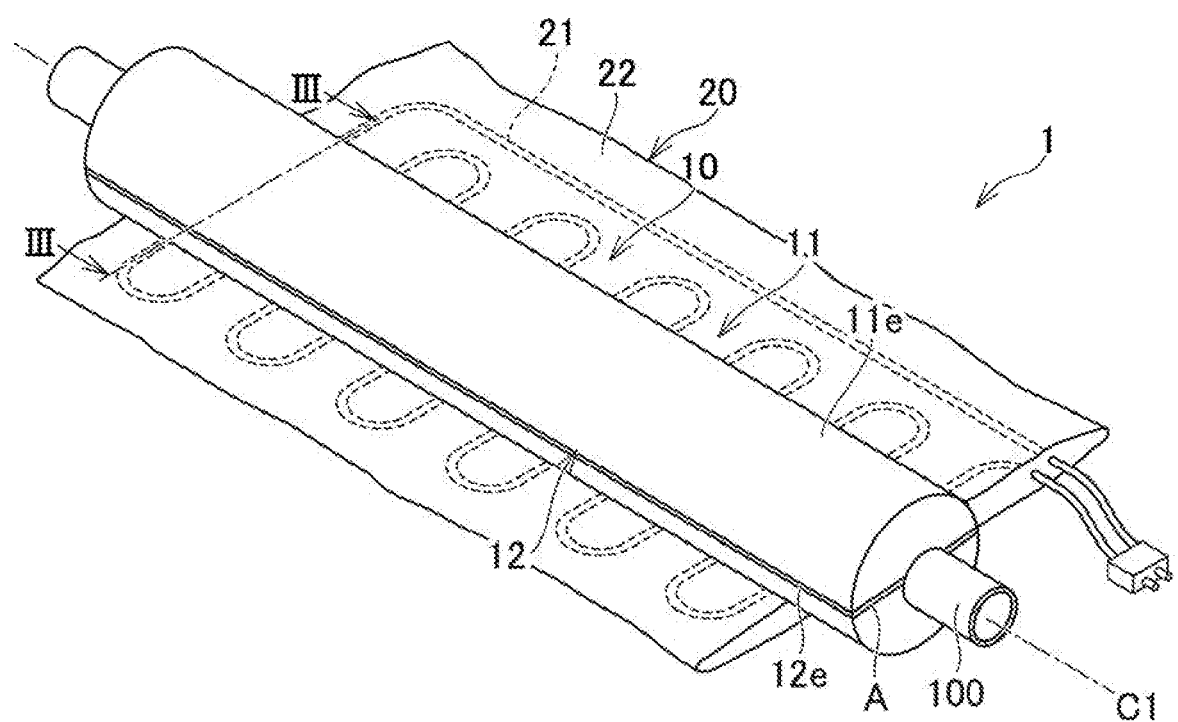
FIG. 1 is a perspective view of an example of a heating device according to an embodiment of the present invention.
Figure 2:
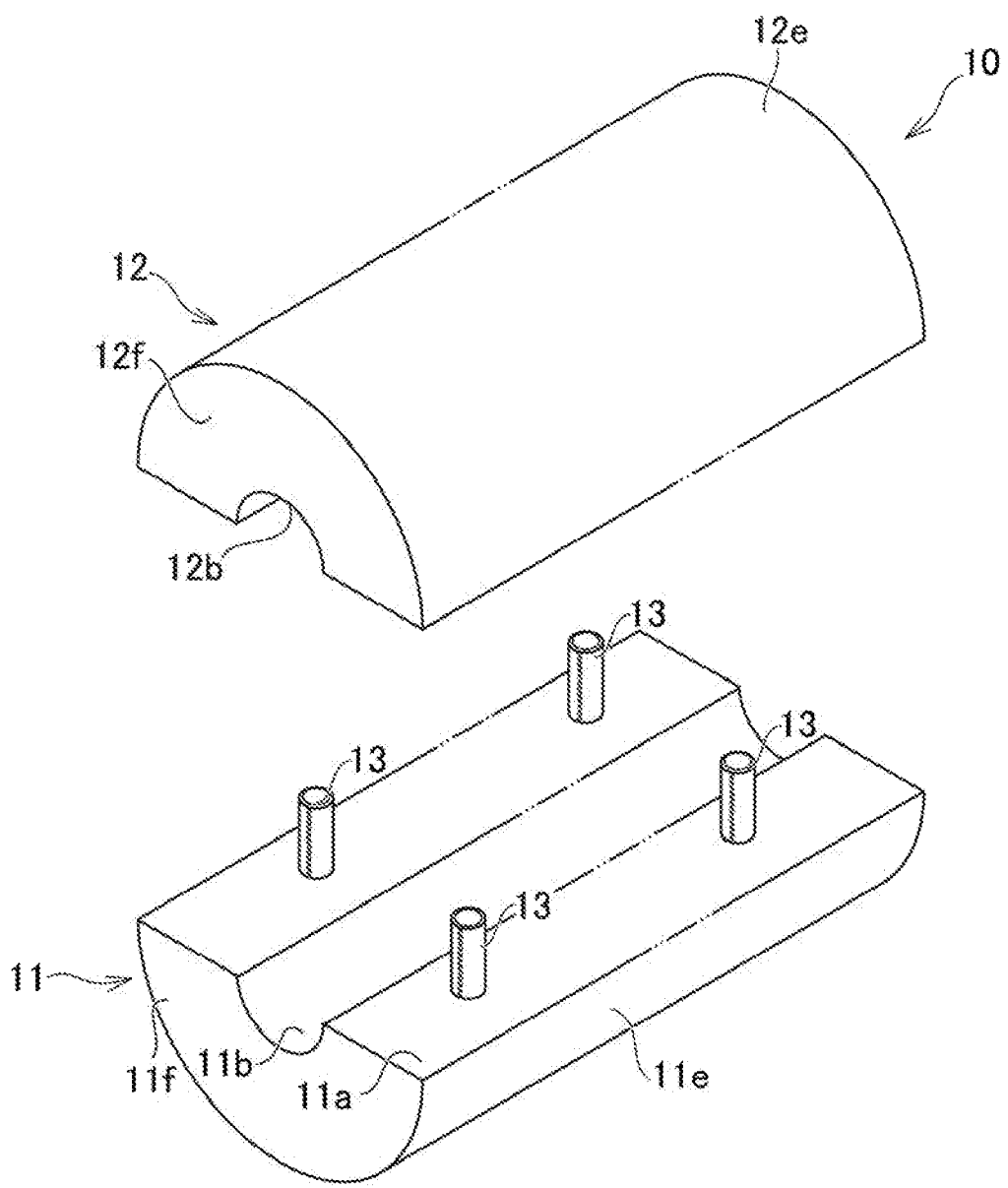
FIG. 2 is an exploded perspective view of a thermally conductive cover included in the heating device.
Figure 3:
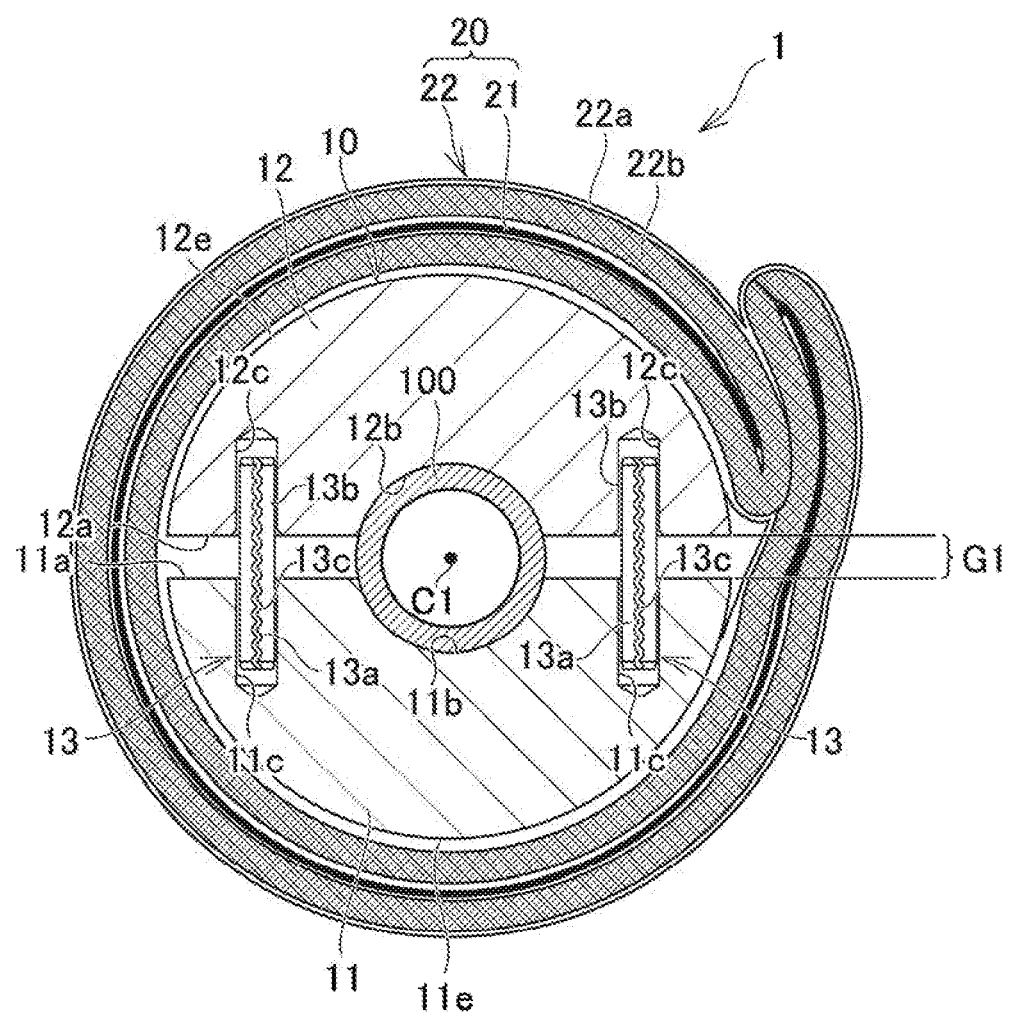
FIG. 3 is a cross sectional view of the heating device taken along the line III-III in FIG. 1.
Figure 4:
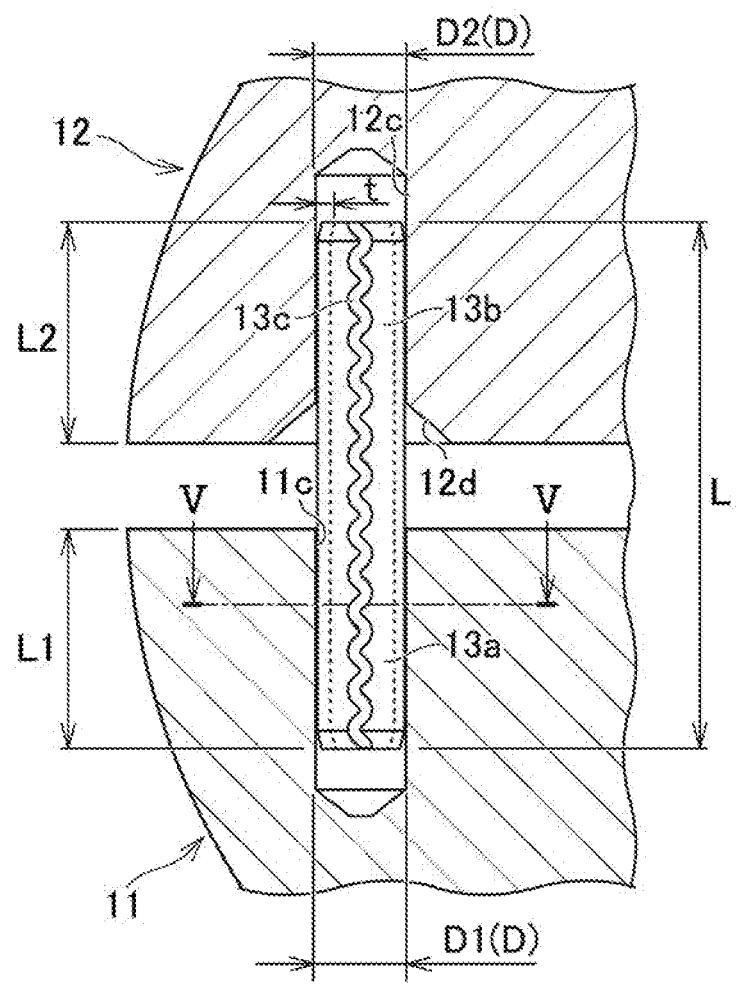
FIG. 4 is an enlarged view of FIG. 3.
Figure 5:
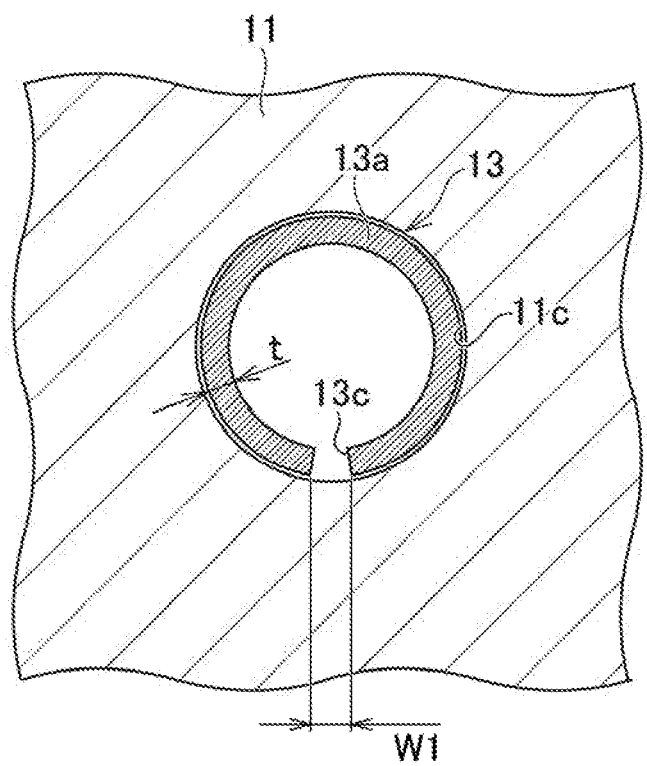
FIG. 5 is a cross sectional view of FIG. 4 taken along the line V-V in FIG. 4.

Embodiments of the present invention will be described below in detail. FIG. 1 is a perspective view of a heating device 1, which is an example of an embodiment of the present invention. FIG. 1 shows a heater 20 being open. FIG. 2 is an exploded perspective view of a thermally conductive cover 10 included in the heating device 1. FIG. 3 is a cross sectional view of the heating device 1 taken along the line III-III in FIG. 1. FIG. 3 is different from FIG. 1 in that the heater 20 covers the outside of the thermally conductive cover 10. FIG. 4 is an enlarged view of FIG. 3. FIG. 5 is a cross sectional view of FIG. 4 taken along the line V-V in FIG. 4.

The heating device 1 includes a thermally conductive cover that covers the outside of the piping system, and includes a heater that covers the outside of the thermally conductive cover and heats the piping system. Here, the piping system includes a pipe, a valve connected to the pipe, a coupling of the pipe, and an elbow, for example. As shown in FIG. 1, in this embodiment, the heating device 1 includes the thermally conductive cover 10 covering a linearly extending pipe 100. The heating device 1 includes the heater 20 covering the outside of the thermally conductive cover 10. The pipe 100 is a relatively small diameter pipe, such as a ⅛ inch pipe, a ¼ inch pipe, a ⅜ inch pipe, and a ½ inch pipe.

As shown in FIG. 1, the thermally conductive cover 10 is a tube-like member, and includes the pipe 100 in its inside.

As a whole, the thermally conductive cover 10 is a tube-like member having a substantially circular cross-section, for example. The thermally conductive cover 10 may be a tube-like member having a substantially square cross-section. The thermally conductive cover 10 includes a first thermal conductor 11 and a second thermal conductor 12. Each of the thermal conductors 11 and 12 is a portion of the thermally conductive cover 10 having an arc-shaped cross-section with an axis C1 as the center. In other words, each of the thermal conductors 11 and 12 has substantially a half of a cylindrical shape. The thermal conductors 11 and 12 are joined together in a direction perpendicular to the axis C1, and form the cylindrical thermally conductive cover 10. In other words, the thermally conductive cover 10 is formed by the thermal conductors 11 and 12 that are joined together so as to hold or cover the piping system.

The thermal conductors 11 and 12 are formed of metal having relatively high thermal conductivity. The thermal conductors 11 and 12 are formed of aluminum, for example. The thermal conductors 11 and 12 may also be formed of copper, for example. Each of the thermal conductors 11 and 12 is integrally formed of metal. For example, each of the thermal conductors 11 and 12 is integrally formed by extrusion molding to extrude a material in the axis C1 direction, or casting. As described later, the thermal conductors 11 and 12 respectively have holes 11c and 12c. These holes 11c and 12c are formed by cutting molded articles.

As shown in FIG. 3, the thermal conductors 11 and 12 respectively have surfaces 11a and 12a that are opposed to each other (surfaces 11a and 12a are referred to as "opposing surfaces"). A groove 11b is formed on the opposing surface 11a of the first thermal conductor 11, and a groove 12b is formed on the opposing surface 12a of the second thermal conductor 12 (see FIG. 2). The pipe 100 is disposed in the inside of the grooves 11b and 12b. Preferably, interior surfaces of the grooves 11b and 12b are curved along the outer surface of the pipe 100, and in closely contact with the outer surface of the pipe 100. That is, the entire interior surfaces of the grooves 11b and 12b are in contact with the outer surface of the pipe 100. This enables to uniformly heat the pipe 100. The configuration of the thermal conductors 11 and 12 is not limited to the example of the thermally conductive cover 10. For example, a groove may be formed on only one of the thermal conductors 11 and 12, and the pipe 100 may be disposed in the groove.

As shown in FIG. 3, with the pipe 100 being disposed between the first thermal conductor 11 and the second thermal conductor 12, a gap G1 is provided between the opposing surfaces 11a and 12a. This allows the interior surfaces of the grooves 11b and 12b to be closely in contact with the outer surface of the pipe 100. When the first thermal conductor 11 and the second thermal conductor 12 are removed from the pipe 100, the first thermal conductor 11 and the second thermal conductor 12 are separated from each other by a finger put on the gap G1. This improves the workability (specifically, efficiency in detachment or disassembly). The gap G1 may not be necessary.

As shown in FIG. 3, a hole 11c is formed on the opposing surface 11a of the first thermal conductor 11. A hole 12c is formed on the opposing surface 12a of the second thermal conductor 12 (in the following, the holes 11c and 12c are referred to as "coupling holes"). The coupling holes 11c and 12c are formed at positions corresponding to each other, and are opposed to each other in the direction perpendicular to the axis C1. The thermally conductive cover 10 includes coupling members 13 formed separately from the thermal conductors 11 and 12. The coupling members 13 are inserted into the coupling holes 11c and 12c to join the thermal conductors 11 and 12 together. In the example of the thermally conductive cover 10, the coupling members 13 have a pin-like form that is long and narrow in the inserting direction.

A plurality of coupling holes 11c are formed on the opposing surface 11a of the first thermal conductor 11. Similarly, a plurality of coupling holes 12c are formed on the opposing surface 12a of the second thermal conductor 12. Specifically, the opposing surface 11a of the first thermal conductor 11 has the coupling holes 11c on one side of the groove 11b, and the other coupling holes 11c on the other side of the groove 11b (see FIG. 3). The opposing surface 11a has the plurality of coupling holes 11c arrayed in a direction along the axis C1 of the thermally conductive cover 10 (extending direction of the pipe 100). In an example of the thermally conductive cover 10, two coupling holes 11c are respectively formed on the ends of the first thermal conductor 11. Similarly to the first thermal conductor 11, the opposing surface 12a of the second thermal conductor 12 has the coupling holes 12c on one side of the groove 12b, and the other coupling holes 12c on the other side of the groove 12b (see FIG. 3). The opposing surface 12a has the plurality of coupling holes 12c arrayed in a direction along the axis C1 of the thermally conductive cover 10 (extending direction of the pipe 100). The number and the positions of the coupling holes 11c and 12c are not limited to the example of the thermally conductive cover 10. For example, thermal conductors 11 and 12 may respectively have three coupling holes 11c and three coupling holes 12c arrayed in the direction along the axis C1.

As shown in FIG. 3, the coupling member 13 includes a part 13a inserted into a coupling hole 11c of the first thermal conductor 11, and a part 13b inserted into a coupling hole 12c of the second thermal conductor 12 (in the following, the part 13a is referred to as "first inserted part" and the part 13b as "second inserted part"). The inserted parts 13a and 13b of the coupling member 13 are configured to be elastically deformable in a direction perpendicular to the inserted direction of the coupling member 13, that is, in a diameter direction of the coupling holes 11c and 12c. In other words, the first inserted part 13a is elastically deformable to conform to a size of the coupling hole 11c of the first thermal conductor 11. The second inserted part 13b is elastically deformable to conform to a size of the coupling hole 12c of the second thermal conductor 12. According to such a configuration of the thermally conductive cover 10, workability of attachment and detachment of the thermal conductors 11 and 12 can be further improved compared to the configuration of joining the thermal conductors 11 and 12 together using screws and ring-like fixtures surrounding the outer circumference of the thermal conductors 11 and 12.

The coupling member 13 is formed of metal. For example, the coupling member 13 is formed of iron alloy, such as steel and stainless steel, and aluminum. The material of the coupling member 13 is not limited to these materials. For example, the coupling member 13 may be formed of resin.

As shown in FIGS. 3 and 5, in the example of the thermally conductive cover 10, the coupling member 13 is a tube-like member extending in the inserted direction of the coupling member 13, and a slit 13c is formed on the coupling member 13 along the extending direction of the coupling member 13. The coupling member 13 is what we call a spring pin. The slit 13c is formed across the first inserted part 13a and the second inserted part 13b. Specifically, the slit 13c extends from one end of the coupling member 13 (upper end in FIG. 3) to the other end of the coupling member 13 (lower end in FIG. 3). As a width W1 (see FIG. 5) of the slit 13c changes, the diameter of the coupling member 13 changes. In other words, the coupling member 13 is elastically deformable such that its diameter is changeable. In the example of the thermally conductive cover 10, the slit 13c is formed in a wave-like shape extending in the direction in which the coupling member 13 extends. However, the slit 13c may be shaped in a straight line.

The outer diameter of the coupling member 13 (first inserted part 13a and second inserted part 13b) in a free state is greater than a diameter of the coupling hole 11c or 12c ("free state" is a state where the coupling member 13 is not inserted into the coupling holes 11c and 12c). In a state where the coupling member 13 is inserted into the coupling holes 11c and 12c, the width of the slit 13c is smaller compared to the case where the coupling member 13 is in the free state. As such, in the state where the coupling member 13 is inserted into the coupling holes 11c and 12c, the outer surface of the coupling member 13 is pressed against the interior surfaces of the coupling holes 11c and 12c due to the elastic force of the coupling member 13. This causes friction between the outer surface of the coupling member 13 and the interior surfaces of the coupling holes 11c and 12c, and the inserted parts 13a and 13b of the coupling member 13 are thereby fixed in the coupling holes 11c and 12c.

The configuration and shape of the coupling member 13 are not limited to the example of the thermally conductive cover 10. For example, only one of the first inserted part 13a and the second inserted part 13b may be elastically deformable such that its diameter is changeable. In other words, the slit 13c may be formed on only one of the inserted parts. In this case, the other inserted part may be press-fitted in the coupling hole. In still another example, the coupling member 13 may include a leaf spring to be inserted into two coupling holes 11c and 12c. In this case, one end of the leaf spring may be pressed against the interior surface of the coupling hole 11c, and the other end of the leaf spring may be pressed against the interior surface of the coupling hole 12c. The coupling member 13 may be formed of a plurality of leaf springs.

In the example of the thermally conductive cover 10, the coupling member 13 is a tube-like member having a circular cross section (see FIG. 5). Each of the coupling holes 11c and 12c is a circular hole in a plan view. In this configuration, as shown in FIG. 5, the outer surface of the coupling member 13 is in contact with the interior surfaces of the coupling holes 11c and 12c over a wide range. As such, strength to join the thermal conductors 11 and 12 together can be readily achieved. Further, according to the cylindrical coupling member 13 included in the thermally conductive cover 10, the coupling member 13 can be easily manufactured. For example, the coupling member 13 can be formed by rolling a small plate-like member into a cylindrical shape.

The coupling member 13 in the free state has the same outer diameter from one end to the other end (as described, "free state" is a state where the coupling member 13 is not inserted into the coupling holes 11c and 12c). At least a part of the coupling hole 12c of the second thermal conductor 12 has a larger diameter than a diameter of the coupling hole 11c of the first thermal conductor 11. Specifically, as shown in FIG. 4, a part 12d close to the opening end of the coupling hole 12c has a larger diameter than a diameter of the coupling hole 11c (the part 12d will be referred to as "larger diameter part"). More specifically, the edge of the coupling hole 12c is chamfered. This forms an oblique surface on the larger diameter part 12d such that the diameter of the coupling hole 12c is gradually widened toward the coupling hole 11c (i.e., toward the opening end of the coupling hole 12c). The end of the coupling member 13 is guided by the oblique surface when the coupling member 13 is inserted into the coupling hole 12c, which serves to improve workability. The coupling hole 11c of the first thermal conductor 11 is not chamfered. As such, the force to fix the first inserted part 13a of the coupling member 13 into the coupling hole 11c is greater than the force to fix the second inserted part 13b into the coupling hole 12c. As shown in FIG. 2, in this configuration, the coupling members 13 remain fixed to the first thermal conductor 11 when the first thermal conductor 11 and the second thermal conductor 12 are separated from each other. This improves the workability of attachment and detachment of the thermally conductive cover 10. Further, according to the configuration using chamfering, the second thermal conductor 12 can be formed without complicated processing.

As described, the coupling holes 11c and 12c are respectively formed on the thermal conductors 11 and 12. Each coupling hole 12c has a larger diameter part 12d having a larger diameter than that of a coupling hole 11c. As such, as shown in FIG. 2, when separating the first thermal conductor 11 and the second thermal conductor 12 from each other, all of the coupling members 13 remain fixed to the first thermal conductor 11. This further improves the workability of detachment of the thermally conductive cover 10 and subsequent attachment of the thermally conductive cover 10. The oblique surface (chamfer) may not be necessarily formed on the larger diameter part 12 of the coupling hole 12c. That is, the diameter of the larger diameter part 12d may be the same throughout the coupling hole 12c in a depth direction.

In the example of the thermally conductive cover 10, the diameter of the coupling hole 12c is larger than the diameter of the coupling hole 11c (the diameter of the coupling hole 12c may be less than or equal to 1.1 times, 1.3 times, 1.5 times, or 1.7 times the diameter of the coupling hole 11c, for example). With this configuration, the force to fix the first inserted part 13a of the coupling member 13 into the coupling hole 11c is greater than the force to fix the second inserted part 13b into the coupling hole 12c. As a result, when separating the first thermal conductor 11 and the second thermal conductor 12 from each other, the coupling members 13 remain fixed to the first thermal conductor 11. This improves the workability of attachment and detachment of the thermally conductive cover 10. In another example, the coupling member 13 may be formed such that the force to fix (force of friction) the first inserted part 13a into the coupling hole 11c is greater than the force to fix (force of friction) the second inserted part 13b into the coupling hole 12c. Specifically, the outer diameter of the first inserted part 13a may be larger than the outer diameter of the second inserted part 13b. In this case, the diameter of the coupling hole 11c of the first thermal conductor 11 may be equal to the diameter of the coupling hole 12c of the second thermal conductor 12. In still another example, one of the first inserted part 13a and the second inserted part 13b may be longer than the other so as to differentiate the force to fix (force of friction) the first inserted part 13a and the second inserted part 13b into the coupling holes 11c and 12c.

As shown in FIG. 3, in the example of thermally conductive cover 10, the coupling hole 11c does not penetrate through the first thermal conductor 11. In other words, the coupling hole 11c has a bottom part. As such, an outer peripheral surface 11e (surface in contact with the heater 20, see FIG. 1) of the first thermal conductor 11 does not include the coupling hole 11c. Similarly, the coupling hole 12c does not penetrate through the second thermal conductor 12. As such, an outer peripheral surface 12e (surface in contact with the heater 20, see FIG. 1) of the second thermal conductor 12 does not include the coupling hole 12c. As a result, as shown in FIG. 1, in the state where the thermal conductors 11 and 12 are joined together, the coupling members 13 do not appear on the outer surface of the thermally conductive cover 10. This configuration can prevent the outer peripheral surface of the thermally conductive cover 10 being not in contact with the heater 20.

Unlike the example of the thermally conductive cover 10, the coupling hole 11c may penetrate through the first thermal conductor 11. Similarly, the coupling hole 12c may penetrate through the second thermal conductor 12. In this case as well, the coupling member 13 may desirably have a sufficient length where the end of the coupling member 13 does not protrude from the outer peripheral surface 11e of the first thermal conductor 11 and the outer peripheral surface 12e of the second thermal conductor 12.

Preferably, the length of the coupling member 13 is determined such that, in the state where the thermal conductors 11 and 12 are joined together with the coupling members 13 as shown in FIG. 4, at least one end of the coupling member 13 is not in contact with the bottom (the deepest position) of the coupling holes 11c and 12c. This ensures the gap G1 between the thermal conductors 11 and 12. The ratio (L/D) between a diameter D and a length L of the coupling member 13 is, for example, from 1.8 to 12.5. The ratio (t/D) between the diameter D and a thickness t of the coupling member 13 is, for example, from 0.09 to 0.19. For example, the diameter D of the coupling member 13 is about 2 mm (specifically, from 2.15 mm to 2.25 mm). In this case, for example, the length L of the coupling member 13 is about 4 mm to 20 mm, and the thickness t of the coupling member 13 is about from 0.2 mm to 0.4 mm. The size of the coupling member 13 is not limited to this example. For example, the diameter D of the coupling member 13 may be less than 2 mm, or greater than 2 mm. For example, the size of the coupling member 13 may be determined to have the diameter D in a range from about 1.6 mm to 2.75 mm, the length L in a range from about 3 mm to 20 mm, and the thickness t in a range from about 0.15 mm to 0.5 mm.

As shown in FIG. 4, a length L1 of the first inserted part 13a is preferably greater than a diameter D1 of the first inserted part 13a. Similarly, a length L2 of the second inserted part 13b is preferably greater than a diameter D2 of the second inserted part 13b. This can readily and fully fix the inserted parts 13a and 13b into the coupling holes 11c and 12c. As described above, each of the diameters D1 and D2 of the inserted parts 13a and 13b (i.e., the diameter D of the coupling member 13) is, for example, about 2 mm. In this case, a length of each of the inserted parts 13a and 13b is preferably equal to or more than 2 mm.

As described above, the heating device 1 includes the heater 20. As shown in FIG. 3, the heater 20 covers the entire outer side of the thermally conductive cover 10. The heater 20 has flexibility of being rolled so as to cover the outside of the thermally conductive cover 10, and spread so as to expose the thermally conductive cover 10. In this case, the heater 20 is fixedly rolled around the outside of the thermally conductive cover 10. For example, a belt (not shown) is wound around the heater 20, or a hook and loop fastener (not shown) is provided at the edge of the heater 20.

The structure of the heater 20 is not limited to the above described example of the heating device 1. For example, the heater 20 may not necessarily be flexible. In this case, the heater 20 may be formed of a plurality of parts each having an arc-shaped cross-section. By combining these parts, the heater 20 may cover the entire outer side of the thermally conductive cover 10.

As shown in FIG. 1, in the example of the heating device 1, the heater 20 includes a heating wire 21 for receiving power and generating heat. The heating wire 21 is, for example, a nichrome wire or a stainless wire. The heater 20 includes an accommodating portion 22 for accommodating the heating wire 21. The housing portion 22 includes, for example, a bag 22a (see FIG. 3) and a thermally conductive portion 22b (see FIG. 3) formed of fibers and particles having thermal conductivity to be filled in the bag 22a.

As described above, the thermally conductive cover 10 includes the first thermal conductor 11 having the opposing surface 11a on which the coupling holes 11c are formed, the second thermal conductor 12 having the opposing surface 12a on which the coupling holes 12c are formed, and the coupling members 13 each having a first inserted part 13a inserted into a coupling hole 11c and a second inserted part 13b inserted into a coupling hole 12c, and coupling the first thermal conductor 11 with the second thermal conductor 12. The first inserted part 13a and the second inserted part 13b are elastically deformable in a direction perpendicular to the inserting direction of the coupling member 13. The thermally conductive cover 10 can improve the workability of attachment of the thermal conductors 11 and 12 to the pipe 100 and detachment of the thermal conductors 11 and 12.

In the process of manufacturing the thermally conductive cover 10 and the heating device 1, the first inserted part 13a of the coupling member 13 is inserted into the coupling hole 11c of the first thermal conductor 11. In a case where a plurality of coupling holes 11c are formed on the first thermal conductor 11, the first inserted parts 13a are respectively inserted into the coupling holes 11c. This allows the coupling members 13 to be attached to the first thermal conductor 11 such that the second inserted parts 13b protrude from the opposing surface 11a of the first thermal conductor 11. In the process of attaching the thermally conductive cover 10 and the heating device 1 to the piping system, the second inserted parts 13b are inserted into the coupling holes 12c of the second thermal conductor 12 while the second inserted parts 13b protrude from the opposing surface 11a of the first thermal conductor 11. This enables to couple the first thermal conductor 11 with the second thermal conductor 12, thereby covering the piping system. Subsequently, the heater 20 covers the thermally conductive cover 10.

The present invention is not limited to the above described embodiment and may be modified in various manners.

For example, the pipe 100 may include a bending part. In this case, one or both of the two thermal conductors 11 and 12 may have a notch for avoiding interference with the bending part.

The heating device 1 may include a plurality of thermal conductors arrayed in the extending direction of the pipe 100. In this case, the coupling holes may be formed on the end faces of the thermal conductors (e.g., see 11f and 12f in FIG. 2), and the coupling members 13 may be used to couple two thermal conductors adjacent in the extending direction of the pipe 100.

The thermally conductive cover 10 may cover the valve provided in the piping system. In this case, the thermally conductive cover 10 may include a plurality of plate-like thermal conductors. These thermal conductors may be joined together to form a box-like thermally conductive cover 10 covering the valve. In this case, coupling holes may be formed on surfaces or end faces of the plate-like thermal conductors, and the coupling members 13 may be inserted into the coupling holes.

Figure 6A:
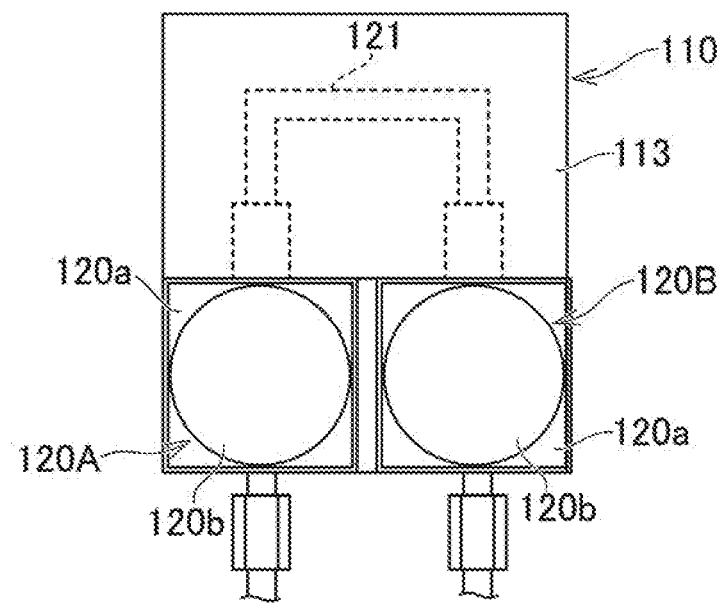
FIG. 6A is a plan view of the thermally conductive cover attached to valve units.
Figure 6B:
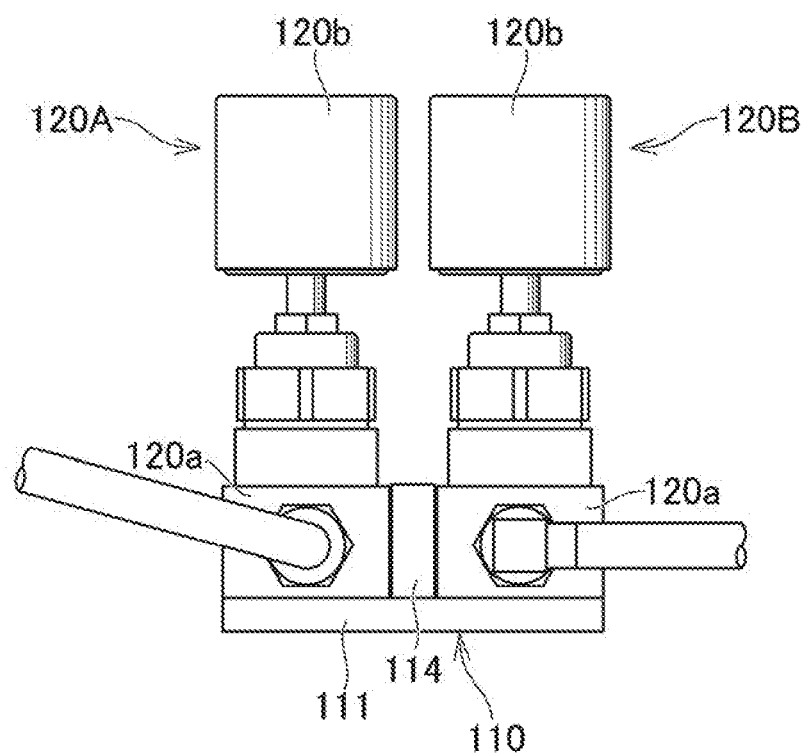
FIG. 6B is a front view of the thermally conductive cover illustrated in FIG. 6A.
Figure 7:
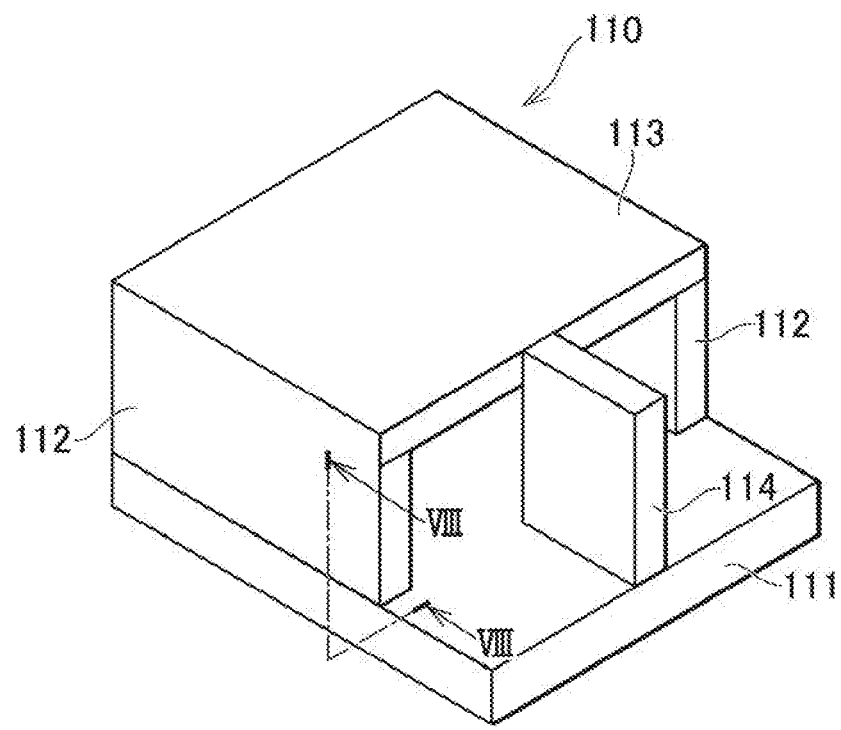
FIG. 7 is a perspective view of the thermally conductive cover illustrated in FIGS. 6A and 6B.
Figure 8:
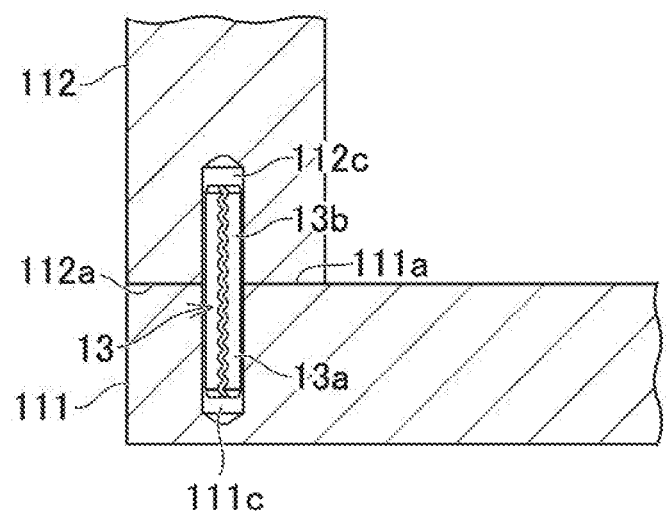
FIG. 8 is a cross sectional view of the thermally conductive cover taken along the line VIII-VIII in FIG. 7.

FIGS. 6A, 6B, 7, and 8 illustrate a thermally conductive cover 110, which is an example the box-like thermally conductive cover. FIGS. 6A and 6B respectively are a plan view and a front view of the thermally conductive cover 110 attached to valve units 120A and 120B. FIG. 7 is a perspective view of the thermally conductive cover 110. FIG. 8 is a cross sectional view of the thermally conductive cover 110 taken along the line VIII-VIII in FIG. 7.

In the examples of FIGS. 6A and 6B, the piping system includes the valve units 120A and 120B and a connecting pipe 121. Each of the valve units 120A and 120B includes a main body 120a accommodating a valve, and includes an actuator 120b attached to the main body 120a. The connecting pipe 121 connects the main bodies 120a of the valve units 120A and 120B.

The thermally conductive cover 110 is formed of a plurality of plate-like thermal conductors, which are joined together and make a box-like shape. As shown in FIG. 7, the thermally conductive cover 110 includes, as thermal conductors, a bottom plate 111, side plates 112, a top plate 113, and a partition plate 114, for example. The main bodies 120a of the valve units 120A and 120B are disposed in the front part of the bottom plate 111, and attached to the bottom plate 111. The side plates 112 are disposed on the right and the left of the rear part of the bottom plate 111, and the top plate 113 is disposed on the upper side of the side plate 112. The bottom plate 111, the side plates 112, and the top plate 113 form a box-like shape, and surround the connecting pipe 121. The partition plate 114 is disposed between the two valve units 120A and 120B. The plates 111 to 114 are formed of aluminum, for example, similarly to the above described thermal conductors 11 and 12. The plates 111 to 114 may be formed of copper, for example.

Two adjacent plates are joined by the coupling members 13 described above. As shown in FIG. 8, for example, the bottom plate 111 includes an opposing surface 111a on which coupling holes 111c are formed. The side plate 112 has an opposing surface 112a on which coupling holes 112c are formed. Each coupling member 13 includes a first inserted part 13a inserted into a coupling hole 111c and a second inserted part 13b inserted into a coupling hole 112c. As described above, the first inserted part 13a and the second inserted part 13b are elastically deformable in a direction perpendicular to the inserting direction of the coupling member 13. The coupling members 13 are also used for joining the top plate 113 and the side plate 112 together, and joining the partition plate 114 and the bottom plate 111 together. The thermally conductive cover 110 can improve the workability of attachment of the plates 111 to 114 to the piping system, and detachment of the plates 111 to 114. A plurality of coupling members 13 may be used for joining two adjacent plates. The thermally conductive cover 110 may be covered by the heater 20.

The structures of the valve units 120A and 120B and the connecting pipe 121 are not limited to the examples of FIGS. 6A and 6B, and may be varied as appropriate. The structure of the thermally conductive cover 110 may also be varied according to the structures of the valve units 120A and 120B and the connecting pipe 121. For example, the thermally conductive cover 110 may be formed in a box-like shape to surround one main body of a valve unit.

In still another example, the thermally conductive cover 10 may cover the elbow provided in the piping system. In this case, the thermal conductors 11 and 12 of the thermally conductive cover 10 may include grooves curved to conform to the elbow instead of the above described grooves 11b and 12b extending linearly.

One of the thermal conductors 11 and 12 may include a hole into which a detecting unit of the temperature sensor is inserted. The hole is formed, for example, on outer peripheral surfaces 11e and 12e of the thermal conductors 11 and 12.

The thermally conductive cover 10 may include a disconnect groove for separating the first thermal conductor 11 and the second thermal conductor 12 from each other in a state where the first thermal conductor 11 and the second thermal conductor 12 are joined together with the coupling members 13. The disconnect groove may be formed on at least either of the thermal conductors 11 and 12 as, for example, a groove (recess) into which a tip of a stick-like tool, such as a screwdriver, is inserted. For example, the groove is formed between the outer surfaces of the thermal conductor 11 (outer peripheral surface 11e and opposing surface 11a) and the outer surfaces of the thermal conductor 12 (outer peripheral surface 12e and opposing surface 12a), and/or between the outer surfaces of the thermal conductor 11 (end face 11f and opposing surface 11a) and the outer surfaces of the thermal conductor 12 (end face 12f and opposing surface 12a). Using this principle by inserting the stick-like tool into the disconnect groove, the first thermal conductor 11 and the second thermal conductor 12 coupled by the coupling members 13 are readily separable from each other. This further improves the workability of detachment of the thermally conductive cover 10.

The invention claimed is:

1. A thermally conductive cover for a piping system including a pipe, the thermally conductive cover comprising:
    a first thermal conductor configured to cover the pipe, the first thermal conductor being formed of metal and comprising a first surface on which a first recess and a plurality of first holes are formed;
    a second thermal conductor configured to, when coupled with the first thermal conductor, cover the pipe, the second thermal conductor being formed of metal and comprising a second surface on which a second recess and a plurality of second holes are formed, the second surface opposing to the first surface when coupled with the first thermal conductor;
    a plurality of coupling members, each of the plurality of coupling members comprising a first inserted part to be inserted into one of the holes of the plurality of first holes and a second inserted part to be inserted into one of the holes of the plurality of second holes, the plurality of coupling members being configured to couple the first thermal conductor with the second thermal conductor,
    wherein:
    at least one of the first inserted part or the second inserted part is elastically deformable in a direction perpendicular to an inserting direction of the coupling member, and
    the first thermal conductor, the second thermal conductor, and the plurality of coupling members are configured so that:
        a plurality of frictional forces that fix the first inserted parts to the plurality of first holes, respectively, are greater than a plurality of frictional forces that fix the second inserted parts to the plurality of the second holes, respectively, and
        when the first thermal conductor and the second thermal conductor are coupled to each other and cover the pipe, the pipe is disposed between the first recess and the second recess and is in direct contact with an inner peripheral surface of the first recess and an inner peripheral surface of the second recess, and a gap is provided between the first thermal conductor and the second thermal conductor.

2. The thermally conductive cover for the piping system according to claim 1, wherein
    the first inserted part and the second inserted part are elastically deformable in the direction perpendicular to the inserting direction of the coupling member.

3. The thermally conductive cover for the piping system according to claim 2, wherein
    the coupling member is a tube-like member extending in the inserting direction of the coupling member and elastically deformable such that a diameter of the coupling member is changeable.

4. The thermally conductive cover for the piping system according to claim 3, wherein
    the coupling member is a tube-like member extending in the inserting direction of the coupling member and including a slit formed along the inserting direction of the coupling member.

5. The thermally conductive cover for the piping system according to claim 1, wherein
    the at least one of the inserted parts is a tube-like member extending in the inserting direction of the coupling member, and elastically deformable such that a diameter of the at least one of the inserted parts is changeable.

6. The thermally conductive cover for the piping system according to claim 1, wherein
    at least a part of the second holes of the plurality of second holes has a diameter greater than a diameter of the first hole.

7. The thermally conductive cover for the piping system according to claim 6, wherein
    a part of the second holes of the plurality of second holes close to an opening end has a diameter greater than the diameter of the first hole.

8. The thermally conductive cover for the piping system according to claim 1, wherein
    a length of the first inserted part is greater than a diameter of the first inserted part, and/or a length of the second inserted part is greater than a diameter of the second inserted part.

9. The thermally conductive cover for the piping system according to claim 1, wherein
    a ratio between a length of the coupling member to the diameter of the coupling member is from 1.8 to 12.5.

10. The thermally conductive cover for the piping system according to claim 1, wherein
    the coupling member is formed of metal.

11. A heating device for a piping system, comprising:
    the thermally conductive cover for the piping system according to claim 1; and
    a heater that covers the thermally conductive cover and heats the piping system through the thermally conductive cover.

12. A method for manufacturing a thermally conductive cover for a piping system including a pipe, the thermally conductive cover comprising:
- a first thermal conductor configured to cover the pipe, the first thermal conductor being formed of metal and comprising a first surface on which a plurality of first holes are formed;
- a second thermal conductor configured to, when coupled with the first thermal conductor, cover the pipe, the second thermal conductor being formed of metal and comprising a second surface on which a plurality of second holes are formed, the second surface opposing to the first surface when coupled with the first thermal conductor; and
- a plurality of coupling members, each of the plurality of coupling members comprising a first inserted part to be inserted into one of the holes of the plurality of first holes and a second inserted part to be inserted into one of the holes of the plurality of second holes,
- wherein the first thermal conductor, the second thermal conductor, and the plurality of coupling members are configured so that:
  - a plurality of frictional forces that fix the first inserted parts to the plurality of first holes, respectively, are greater than a plurality of frictional forces that fix the second inserted parts to the plurality of the second holes, respectively, and
  - when the first thermal conductor and the second thermal conductor are coupled to each other and cover the pipe, the pipe is disposed between the first recess and the second recess and is in direct contact with an inner peripheral surface of the first recess and an inner peripheral surface of the second recess, and a gap is provided between the first thermal conductor and the second thermal conductor,
- the method comprising:
  - attaching each of the coupling members to the first thermal conductor by inserting the first inserted part into one of the holes of the plurality of first holes such that the second inserted part protrudes from the first surface, the second inserted part being elastically deformable in a direction perpendicular to an inserting direction of the first inserted part.

13. A method for attaching a thermally conductive cover for a piping system including a pipe, the thermally conductive cover comprising:
- a first thermal conductor configured to cover the pipe, the first thermal conductor being formed of metal and comprising a first surface on which a plurality of first holes are formed;
- a second thermal conductor configured to, when coupled with the first thermal conductor, cover the pipe, the second thermal conductor being formed of metal and comprising a second surface on which a plurality of second holes are formed, the second surface opposing to the first surface when coupled with the first thermal conductor; and
- a plurality of coupling members, each of the plurality of coupling members comprising a first inserted part to be inserted into one of the holes of the plurality of first holes and a second inserted part to be inserted into one of the holes of the plurality of second holes,
- wherein the first thermal conductor, the second thermal conductor, and the plurality of coupling members are configured so that:
  - a plurality of frictional forces that fix the first inserted parts to the plurality of first holes, respectively, are greater than a plurality of frictional forces that fix the second inserted parts to the plurality of the second holes, respectively, and
  - when the first thermal conductor and the second thermal conductor are coupled to each other and cover the pipe, the pipe is disposed between the first recess and the second recess and is in direct contact with an inner peripheral surface of the first recess and an inner peripheral surface of the second recess, and a gap is provided between the first thermal conductor and the second thermal conductor,
- the method comprising:
  - in a state where the first inserted part is inserted into one of the holes of the plurality of first holes and the coupling member is attached to the first thermal conductor such that the second inserted part protrudes from the first surface, inserting the second inserted part into one of the holes of the plurality of second holes of the second thermal conductor so that the first thermal conductor and the second thermal conductor are joined together to cover the pipe, the second inserted part being elastically deformable in a direction perpendicular to an inserting direction of the first inserted part.

14. The method according to claim 13, wherein the outer circumference of the pipe is greater than a total length of the inner peripheral surface of the first recess and the inner peripheral surface of the second recess.

15. A method for manufacturing a heating device for a piping system including a pipe, the heating device comprising:
- a first thermal conductor configured to cover the pipe, the first thermal conductor being formed of metal and comprising a first surface on which a plurality of first holes are formed;
- a second thermal conductor configured to, when coupled with the first thermal conductor, cover the pipe, the second thermal conductor being formed of metal and comprising a second surface on which a plurality of second holes are formed, the second surface opposing to the first surface when coupled with the first thermal conductor;
- a plurality of coupling members, each of the plurality of coupling members comprising a first inserted part to be inserted into one of the holes of the plurality of first holes and a second inserted part to be inserted into one of the holes of the plurality of second holes; and
- a heater configured to heat the pipe through the first thermal conductor and the second thermal conductor by covering the first thermal conductor and the second thermal conductor,
- wherein the first thermal conductor, the second thermal conductor, and the plurality of coupling members are configured so that:
  - a plurality of frictional forces that fix the first inserted parts to the plurality of first holes, respectively, are greater than a plurality of frictional forces that fix the second inserted parts to the plurality of the second holes, respectively, and
  - when the first thermal conductor and the second thermal conductor are coupled to each other and cover the pipe, the pipe is disposed between the first recess and the second recess and is in direct contact with an inner peripheral surface of the first recess and an inner peripheral surface of the second recess, and a gap is provided between the first thermal conductor and the second thermal conductor, the method comprising:

attaching the coupling member to the first thermal conductor by inserting the first inserted part into one of the holes of the plurality of first holes such that the second inserted part protrudes from the first surface, the second inserted part being elastically deformable in a direction perpendicular to an inserting direction of the first inserted part.

16. A method for attaching a heating device for a piping system including a pipe, the heating device comprising:

a first thermal conductor configured to cover the pipe, the first thermal conductor being formed of metal and comprising a first surface on which a plurality of first holes are formed;

a second thermal conductor configured to, when coupled with the first thermal conductor, cover the pipe, the second thermal conductor being formed of metal and comprising a second surface on which a plurality of second holes are formed, the second surface opposing to the first surface when coupled to the first thermal conductor;

a plurality of coupling members, each of the plurality of coupling members comprising a first inserted part to be inserted into one of the holes of the plurality of first holes and a second inserted part to be inserted into one of the holes of the plurality of second holes; and a heater for heating the piping system through the first thermal conductor and the second thermal conductor by covering the first thermal conductor and the second thermal conductor, wherein the first thermal conductor, the second thermal conductor, and the plurality of coupling members are configured so that:

a plurality of frictional forces that fix the first inserted parts to the plurality of first holes, respectively, are greater than a plurality of frictional forces that fix the second inserted parts to the plurality of the second holes, respectively, and when the first thermal conductor and the second thermal conductor are coupled to each other and cover the pipe, the pipe is disposed between the first recess and the second recess and is in direct contact with an inner peripheral surface of the first recess and an inner peripheral surface of the second recess, and a gap is provided between the first thermal conductor and the second thermal conductor, the method comprising:

in a state where the first inserted part is inserted into one of the holes of the plurality first holes and the coupling member is attached to the first thermal conductor such that the second inserted part protrudes from the first surface, inserting the second inserted part into one of the holes of the plurality of second holes of the second thermal conductor so that the first thermal conductor and the second thermal conductor are joined together to cover pipe, the second inserted part being elastically deformable in a direction perpendicular to an inserting direction of the first inserted part.

17. The method according to claim 16, wherein the outer circumference of the pipe is greater than a total length of the inner peripheral surface of the first recess and the inner peripheral surface of the second recess.

18. A piping system comprising:

the thermally conductive cover according to claim 1; and the pipe, wherein the outer circumference of the pipe is greater than a total length of the inner peripheral surface of the first recess and the inner peripheral surface of the second recess.

19. A method for manufacturing a piping system, the method comprising:

manufacturing the thermally conductive cover according to claim 12; and providing the pipe, wherein the outer circumference of the pipe is greater than a total length of the inner peripheral surface of the first recess and the inner peripheral surface of the second recess.

20. A method for manufacturing a piping system, the method comprising:

manufacturing the heating device according to claim 15; and providing the pipe, wherein the outer circumference of the pipe is greater than a total length of the inner peripheral surface of the first recess and the inner peripheral surface of the second recess.

* * * * *